United States Patent
Bok et al.

(10) Patent No.: US 7,639,302 B2
(45) Date of Patent: Dec. 29, 2009

(54) AUTO-FOCUSING METHOD USING VARIABLE NOISE LEVEL AND DIGITAL IMAGE PROCESSING APPARATUS USING THE SAME

(75) Inventors: Young-soo Bok, Seongnam-si (KR); Jae-hyo Jung, Seongnam-si (KR)

(73) Assignee: Samsung Digital Imaging Co., Ltd., Suwon-si (KR)

( * ) Notice: Subject to any disclaimer, the term of this patent is extended or adjusted under 35 U.S.C. 154(b) by 522 days.

(21) Appl. No.: 11/403,182

(22) Filed: Apr. 11, 2006

(65) Prior Publication Data

US 2007/0132877 A1     Jun. 14, 2007

(30) Foreign Application Priority Data

Dec. 12, 2005 (KR) ................. 10-2005-0121904

(51) Int. Cl.
G03B 13/00 (2006.01)

(52) U.S. Cl. ............ 348/345; 348/216.1; 348/241; 348/243; 348/248; 348/349

(58) Field of Classification Search ........ 348/345, 348/241, 243, 248, 216.1, 349
See application file for complete search history.

(56) References Cited

U.S. PATENT DOCUMENTS

| | | | |
|---|---|---|---|
| 6,580,062 B2 * | 6/2003 | Baer | 250/201.2 |
| 7,095,443 B2 * | 8/2006 | Yoshikawa | 348/350 |
| 2004/0130650 A1 * | 7/2004 | Lee et al. | 348/345 |
| 2005/0128358 A1 * | 6/2005 | Nakajima et al. | 348/678 |
| 2005/0276592 A1 * | 12/2005 | Stavely et al. | 396/111 |

FOREIGN PATENT DOCUMENTS

| | | | |
|---|---|---|---|
| JP | 2001-128056 A | 5/2001 |
| JP | 2002-287013 A | 10/2002 |
| JP | 2005-091456 A | 4/2005 |

\* cited by examiner

*Primary Examiner*—Jason Chan
*Assistant Examiner*—Yih-Sien Kao
(74) *Attorney, Agent, or Firm*—Drinker Biddle & Reath LLP

(57) ABSTRACT

An auto-focusing method and a digital image processing apparatus using the same are disclosed. The auto-focusing method includes: setting a reference noise level if an illuminance of a photographing area is larger than a predetermined reference value, and setting a variable noise level that varies according to the illuminance of photographing area if the illuminance of photographing area is smaller than or equal to the predetermined reference value; calculating a focus value of each position of the focus lens while driving the focus lens within the predetermined lens-driving range in the unit of a step and selecting a maximum focus value of the predetermined lens-driving range among the calculated focus values, wherein in the calculating of the focus value, the noise level is subtracted from a pixel data that is larger than the noise level and the result of subtracting is used as the pixel data to calculate the focus value.

19 Claims, 14 Drawing Sheets

AUTO-FOCUSING METHOD USING VARIABLE NOISE LEVEL AND DIGITAL IMAGE PROCESSING APPARATUS USING THE SAME

CROSS-REFERENCE TO RELATED PATENT APPLICATION

This application claims the benefit of Korean Patent Application No. 10-2005-0121904, filed on Dec. 12, 2005, in the Korean Intellectual Property Office, the disclosure of which is incorporated herein in its entirety by reference.

BACKGROUND OF THE INVENTION

1. Field of the Invention

The present invention relates to an auto-focusing method and a digital image processing apparatus using the same, and more particularly to an auto-focusing method that drives a focus lens to a final focus position through performing an auto-focusing function within a predetermined lens-driving range in response to a photographing signal, and a digital image processing apparatus using the same.

2. Description of the Related Art

An auto-focusing method for a digital camera was disclosed in U.S. Patent Publication No. 20040130650, entitled "METHOD OF AUTOMATICALLY FOCUSING USING A QUADRATIC FUNCTION IN CAMERA," by the same applicant of the present invention. According to the auto-focusing method disclosed, the focus lens is controlled to be a target focus position through performing an auto-focusing function within a predetermined lens-driving range in response to a photographing signal inputted from a user in the auto-focusing mode.

Hereinafter, the conventional auto-focusing method will be briefly described.

At first, focus values are calculated at each position of the focus lens while the focus lens is driven in the unit of a step within a lens-driving range. The focus value of each focus lens position is calculated by adding different values between adjacent pixel data.

Then, the maximum focus value within the lens-driving range is selected from the calculated focus values, and the focus lens is driven to the position of maximum focus value. In order to quickly find the maximum focus value within the predetermined lens-driving range, a variation ratio between adjacent focus values is used.

If an illuminance in a photographing area is extremely low, the variation ratio between adjacent focus values is low too because it varies according to the illuminance of the photographing characteristics. That is, if the illuminance of photographing area is low, the accuracy is degraded and the speed of auto-focusing is reduced. Therefore, the auto-focusing cannot be accurately performed in a photographing area with low illuminance according to the conventional auto-focusing method for digital image processing apparatus.

SUMMARY OF THE INVENTION

The present invention provides an auto-focusing method for accurately and rapidly performing an auto-focusing where the illuminance of a photographing area is low, and a digital image processing apparatus using the same.

According to an aspect of the present invention, there is provided an auto-focusing method for a digital image processing apparatus that drives a focus lens to a final focus position through performing auto-focusing within a lens-driving range according to a photographing signal, the auto-focusing method including: setting a reference noise level if the illuminance of a photographing area is larger than a reference value, and setting a variable noise level that varies according to the illuminance of the photographing area if the illuminance of the photographing area is smaller than or equal to the reference value; calculating a focus value for each position of the focus lens while driving in the unit of a step the focus lens within the lens-driving range and selecting a maximum focus value of the lens-driving range among the calculated focus values, wherein in the calculating of the focus value, the noise level is subtracted from a pixel data that is larger than the noise level and the result of subtracting is used as the pixel data to calculate the focus value.

According to another aspect of the present invention, there is provided a digital image processing apparatus for performing an auto-focusing in a lens-driving range according to a photographing signal and driving the focus lens to the final focus position, including an optical system having a focus lens, a driving unit for the focus lens, an optoelectric converting unit for receiving light from the optical system and converting the received light to pixel signals, an analog-to-digital converter for converting the pixel signals from the optoelectric converting unit to pixel data, and a controlling unit. Herein, the controlling unit performs the auto-focusing method.

In the initialization, a variable noise level is set if the illuminance of the photographing area is smaller than or equal to the reference value. In the calculating of the focus value using pixel data, the noise level is subtracted from a pixel data that is larger than the noise level and the result of subtracting may be used as the pixel data to calculate the focus value.

The focus values are proportional to the illuminance in the photographing area since the pixel data is variably decreased according to the illuminance of the photographing area if the illuminance value of photographing area is smaller than or equal to the reference value. Also, the variation ratio between adjacent focus values is in reverse proportion to the illuminance of photographing area. As a result, the present invention overcomes the problem that the variation ratio between adjacent focus values is decreased according to the illuminance of photographing area.

Finally, the auto-focusing method and the digital image processing apparatus using the same according to the present invention accurately and quickly adjust the focus of the target object when illuminance in the photographing area is low.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Figure 1:
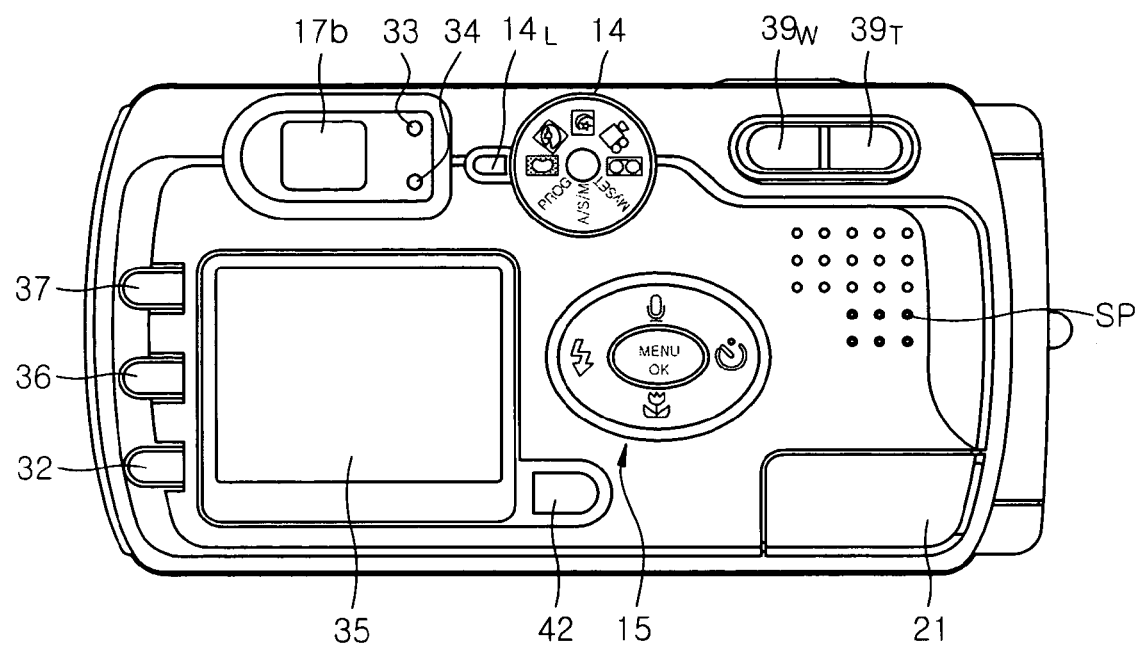
FIG. 1 is a perspective view of a digital camera as a digital image processing apparatus according to an embodiment of the present invention.

Referring to FIG. 1, the digital camera, as a digital image processing apparatus according to an embodiment of the present invention, includes a mode dial 14, function buttons 15, a manual-focusing/delete button 36, a manual-control/reproducing button 37, a reproducing mode button 42, a speaker (SP), a monitor button 32, an auto-focus lamp 33, a view-finder 17b, a flash ready lamp 34, a color LCD panel 35, a wide angle-zoom button 39w, a telephoto-zoom button 39t and an external interface 21.

The mode dial 14 is used to select one of operating modes of the camera and to set the selected operating mode, such as a synchronized photographing mode, a program photographing mode, a portrait photographing mode, a night-view photographing mode, a manual photographing mode, a moving picture photographing mode, a user setting mode and a recording mode.

For example, in the synchronized photographing mode, a target object is photographed by synchronizing the photographed image with a supplementary image. The user setting mode sets photographing information for the still image photographing mode and the moving picture photographing mode. The recording mode is used to record voice only.

The function buttons 15 are used to perform various functions of the digital camera in response to the user.

The manual-focusing/delete button 36 is used to manually adjust the focus of a target object or to delete a previously captured image. The manual-control/reproducing button 37 is used to manually control functions or to stop/play moving pictures in the reproducing mode. The reproducing mode button 42 is used to change the reproducing mode to a preview mode.

The monitor button 32 is used to control operations of the color LCD panel 35. For example, the first time a user activates the monitor button 32, the color LCD panel 35 displays an image of a target object and related information. If the user activates the monitor button 32 a second time, after displaying the image of the target object and related information, the color LCD panel 35 is turned off. Additionally, if the user activates the monitor button 32 while one of the image files is reproduced in the reproducing mode, the information related to the reproduced image file is displayed on the color LCD panel 35. If the user activates the monitor button 32 a second time, the information related to the reproduced image file displayed on the color LCD panel 35 disappears.

The auto-focus lamp 33 is turned on when the focus on the target object is adjusted. The flash ready lamp 34 is turned on when the flash is ready to flash. The mode indicating lamp $14_L$ indicates the mode selected by the mode dial 14.

Figure 2:
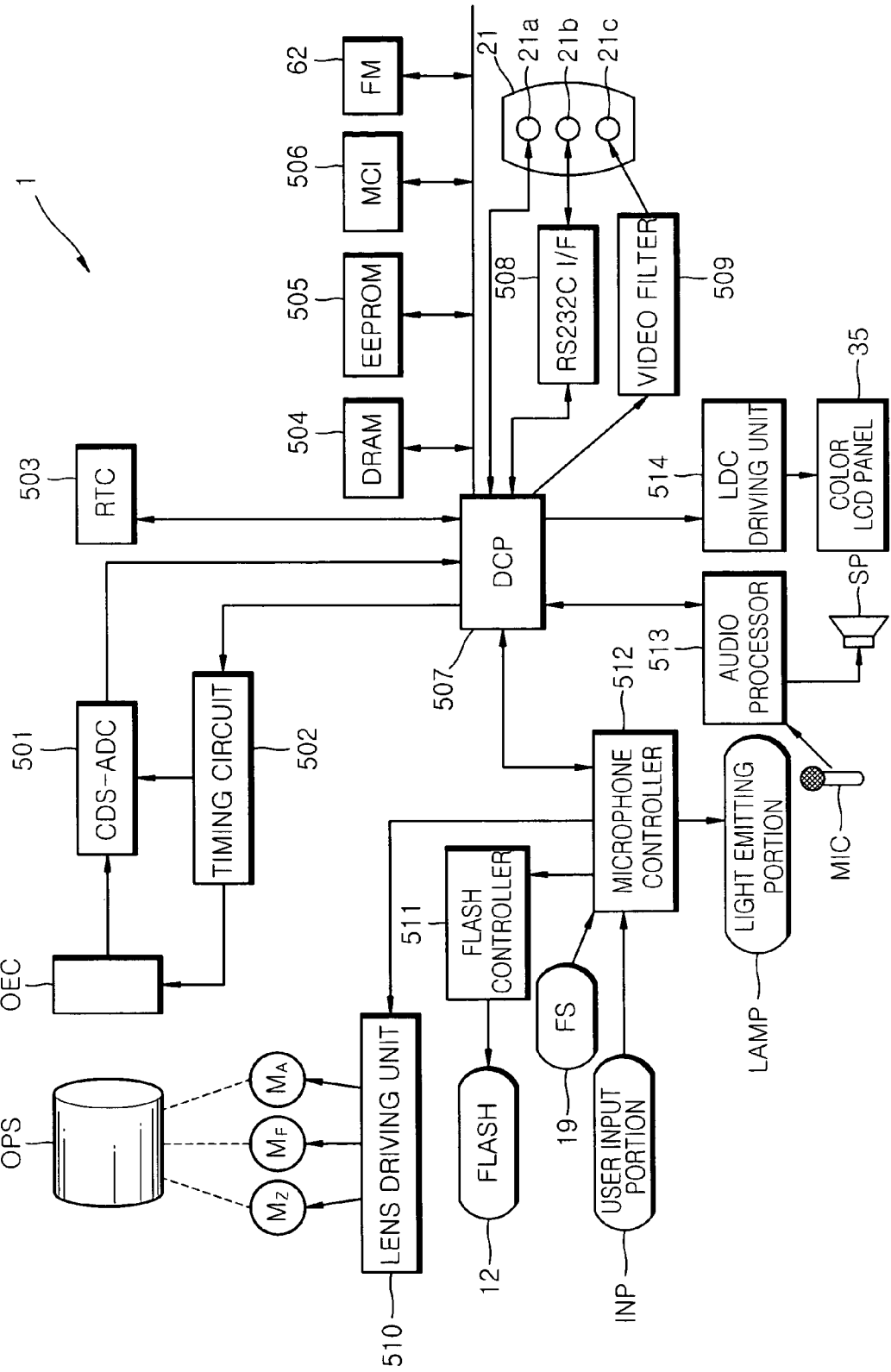
FIG. 2 is a block diagram illustrating the overall structure of the digital camera shown in FIG. 1
Figure 3:
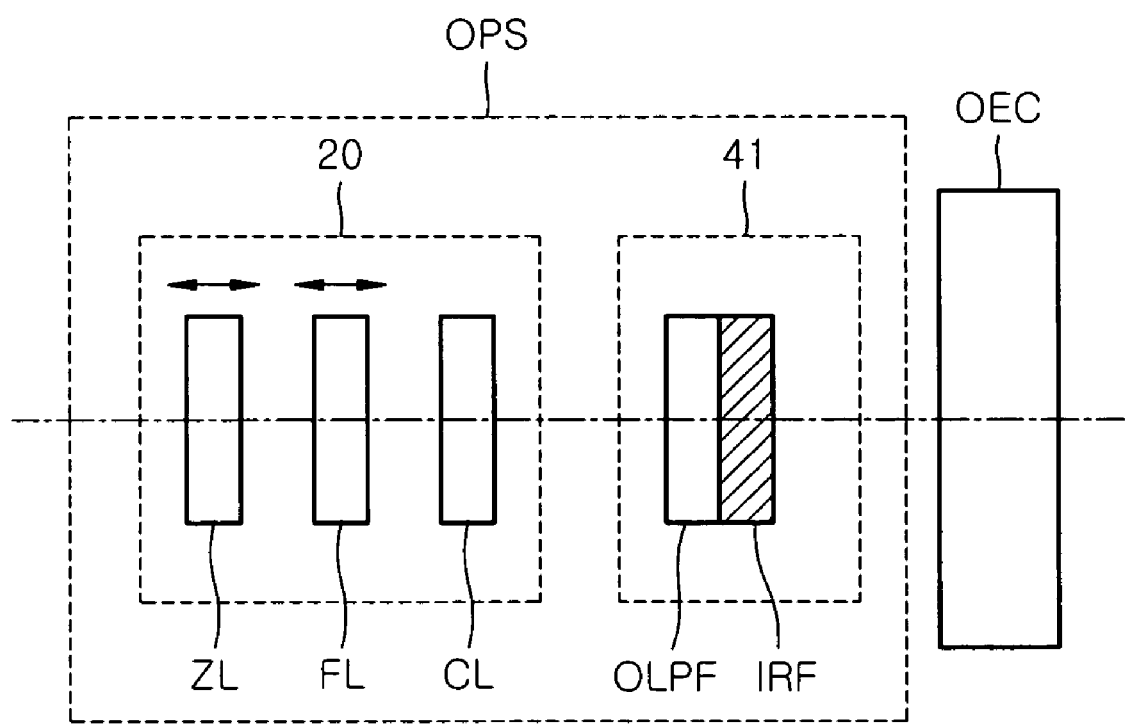
FIG. 3 is a view illustrating the structure of the input side of the digital camera of FIG. 1.

FIG. 2 is a block diagram illustrating the overall structure of the digital camera shown in FIG. 1, and FIG. 3 is a view illustrating the structure of the input side of the digital camera of FIG. 1. Hereinafter, the structure and operations of the digital camera shown in FIG. 1 will be described with reference to FIGS. 1 through 3.

An optical system OPS includes a lens portion 20 and a filter portion 41, and optically processes light from a target object. The lens 20 includes a zoom lens ZL, a focus lens FL and a compensation lens CL.

When a user presses the wide angle zoom button 39w of FIG. 1 or the telephoto zoom button 39t of FIG. 1, user input portion INP, a corresponding signal is input to a microcontroller 512. Accordingly, the microcontroller 512 controls a lens-driving unit 510 in order to drive a zoom motor Mz so that the zoom lens ZL is lengthened and the angle of view decreases. In accordance with these features, the microcontroller 512 determines an angle of view with respect to the position of the zoom lens ZL from design data of the optical system OPS. Since the position of the focus lens FL is adjusted while the zoom lens ZL is in a set position, the angle of view is scarcely affected by the position of the focus lens FL.

In the auto-focusing mode, a main controller in the digital camera processor 507 controls the focus motor $M_F$ by controlling the driving unit 510 through the microcontroller 512. Accordingly, the focus lens FL is driven and a focus value for each position of the focus lens is calculated. The number of driving steps of the focus motor $M_F$ is determined by the position of the maximum focus value within the lens-driving range among the calculated focus values. The algorithm thereof of digital camera processor 507 in the auto-focusing mode will be described later with reference to FIGS. 6 through 20.

The compensation lens CL of the lens portion 20 is not separately driven because it compensates overall reflective index. The reference $M_A$ denotes a motor for driving an aperture (not shown).

In the filter portion 41 of the optical system OPS, an optical low-pass filter (OLPF) removes optical noise of high frequency. An infrared cut filter (IRF) blocks the infrared component of incident light.

An optoelectric converting portion (OEC) of a charge coupled device (CCD) or a complementary metal-oxide-semiconductor (CMOS) converts the light captured by the optical system OPS to an electrical analog signal. A digital camera processor 507 controls a timing circuit 502 to control the operation of the optoelectric converting unit (OEC) and a correlation double sampler and analog-to-digital converter (CDS-ADC) 501. The analog-to-digital converter processes an analog signal outputted from the optoelectric converting unit OEC, removes high frequency noise, adjusts the amplitude, and converts the analog signal to pixel data.

The real-time clock 503 provides time information to the digital camera processor 507. The digital camera processor 507 generates pixel data classified into brightness and chromaticity by processing pixel data input from the CDS-ADS unit 501.

The light emitting portion LAMP is driven by the microcontroller 512 according to control signals generated from the digital camera processor 507. The light emitting portion LAMP includes an auto-focus lamp 33, a mode indicating lamp $14_L$ and a flash ready lamp 34. The user input portion (INP) includes a shutter release button, a mode dial 14, functional buttons 15, a monitor button 32, a manual-focus/delete button 36, a manual-control/reproduce button 37, an optical-zoom button $39_w$ and a telescopic-zoom button $39_T$.

The digital image signal output from the digital camera processor 507 is temporarily stored in a dynamic random access memory (DRAM) 504. An algorithm and set data needed for the operation of the digital camera processor 507 is stored in an electrically erasable programmable read only memory (EEPROM) 505. A removable memory card may be inserted in a memory card interface 506.

The LCD driving unit 514 receives the pixel data of the digital camera processor 507 and displays the received pixel data on the color LCD panel 35.

Meanwhile, the pixel data of digital camera processor 507 may be transmitted through a universal serial bus (USB) connecting unit 21A or a RS232C interface 508 and a connector thereof 21b by serial communication. Also, the pixel data may be transmitted through the video filter 509 and the video output unit 21c as a video signal.

The audio processor 513 receives a voice signal from a microphone MIC and outputs the received voice signal to the digital camera processor 507 or the speaker SP. Also, the audio processor 513 receives an audio signal from the digital camera processor 507 and outputs the received audio signal to the speaker SP.

The microcontroller 512 controls the flash 12 by controlling the flash controller 511 according to a signal output from the flash-light sensor 19.

Figure 4:
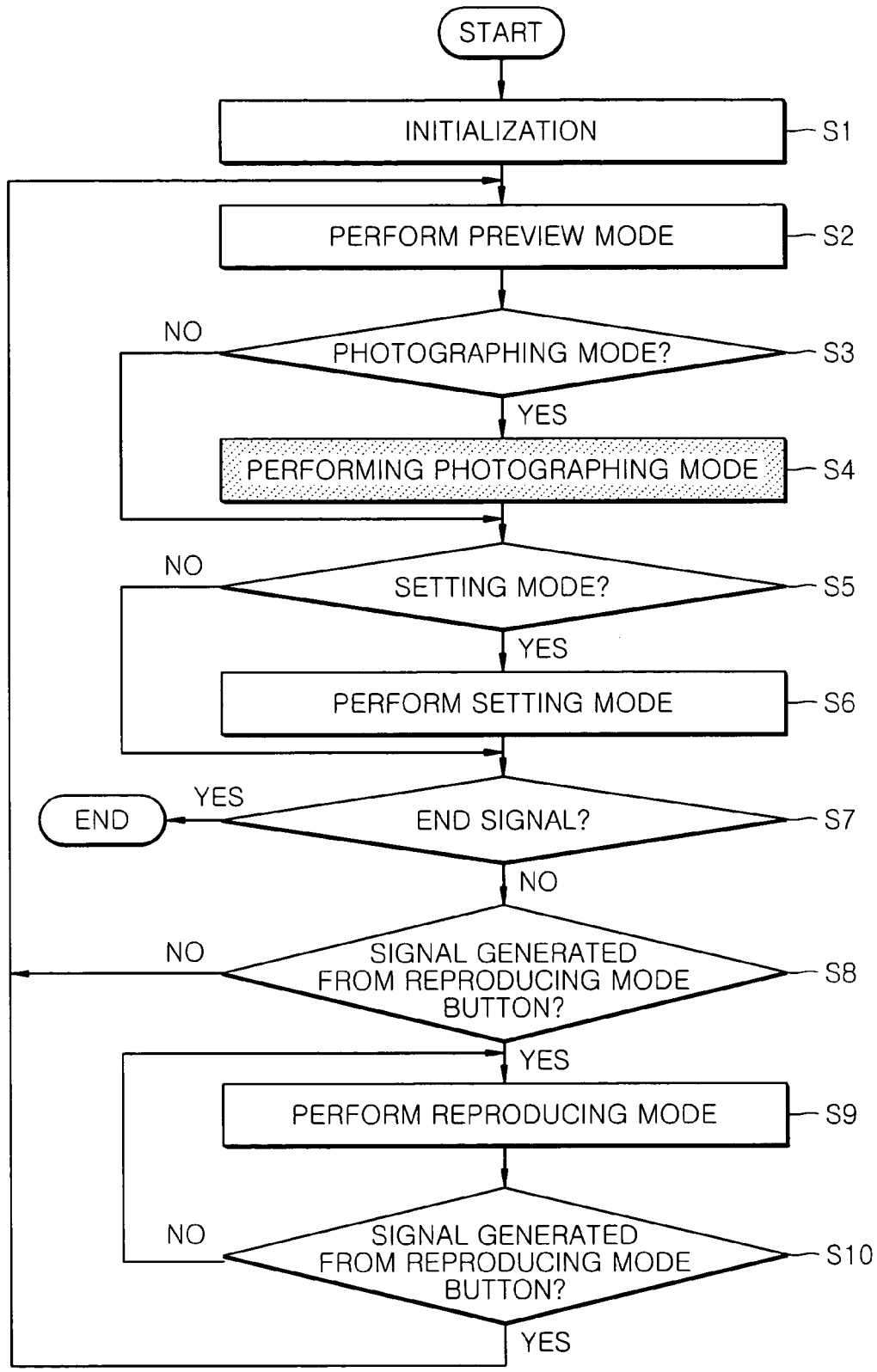
FIG. 4 is a flow chart of a main algorithm in the digital camera processor shown in FIG. 2.

FIG. 4 is a flow chart of a main algorithm in the digital camera processor shown in FIG. 2. The main algorithm of the digital camera processor 507 shown in FIG. 2 will be described with reference to FIGS. 1 through 4.

When the electric power is supplied to the digital camera 1, the digital camera processor 507 is initialized in operation S1. After the initializing process, the digital camera processor 507 performs a preview mode in operation S2. In the preview mode, the input images are displayed on the display panel 35.

Then, in operation S3, if an SH1 signal that is a first step signal from a shutter release button is in an ON-state, the digital camera processor 507 performs the photographing mode in operation S4. The algorithm for performing the photographing mode will be described with reference to FIG. 5.

Then, in operation S5, it determines whether or not a signal for a setting mode has been input from the user input portion INP. If the signal for the setting mode has been input, the setting mode in operation S6 sets operating conditions according to the input signal from the INP.

If a termination signal is not generated in operation S7, the digital camera processor 507 continuously performs the following operations.

At first, it determines in operation S8 whether a signal has been generated from the reproducing mode button 42 in the INP. If the signal has been generated from the reproducing mode button 42, the reproducing mode is performed in operation S9. In the reproducing mode, operating conditions are set according to the input signals from the INP, and the reproducing mode is performed. Then, if the signal is generated again from the reproducing mode button 42 in operation S10, the operations in S2 through S10 are performed again.

Figure 5:
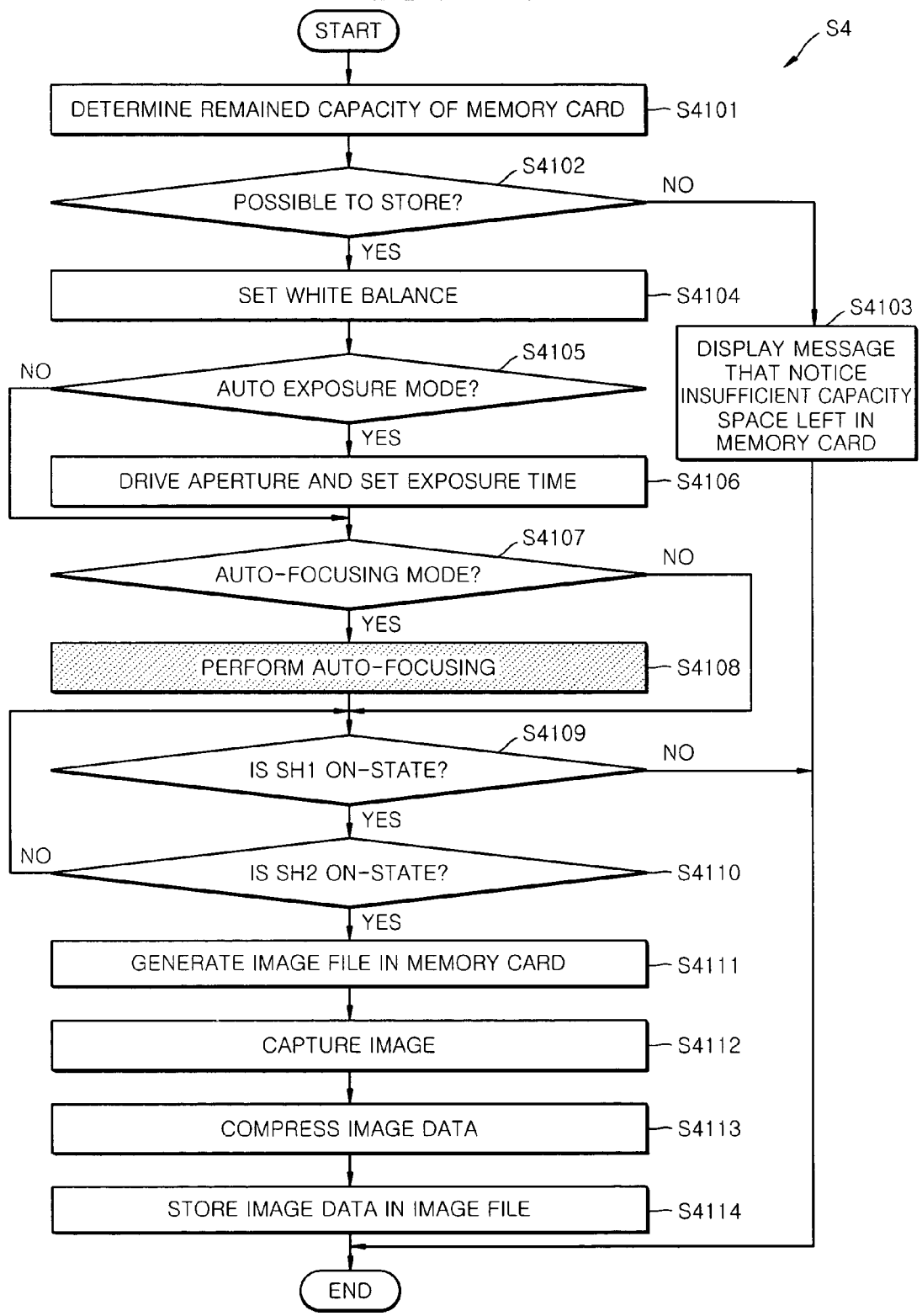
FIG. 5 is a flowchart of an algorithm for the photographing mode operation S4 in FIG. 4.

FIG. 5 is a flowchart of an algorithm for the photographing mode operation S4 in FIG. 4. The algorithm for the photographing mode operation S4 will be described with reference to FIG. 5, hereinafter. The photographing mode operation S4 begins when the SH1 signal that is the first step signal from the shutter release button goes to the ON state. Herein, it assumes that a current position of a zoom lens ZL is already set.

At first, the digital camera processor 507 determines whether there is a space left in a memory card in operation S4101 and then determines whether the remaining space is sufficient to store pixel data in operation S4102. If the remaining space is insufficient, the digital camera processor 507 displays a message that the insufficient memory is left in the memory card and terminates the normal photographing mode in operation S4103. If the remaining space is sufficient to store the pixel data, the digital camera processor 507 performs the following operations.

At first, the digital camera processor 507 performs the white balance according to the currently set photographing conditions and sets the parameters related to the white balance in operation S4104.

Then, if it is in automatic exposing mode in operation S4105, the digital camera processor 507 outputs the divergence of the aperture (not shown) according to the amount of incident light to the microcontroller 510 to drive the aperture motor $M_A$ and sets the exposure time in operation S4106.

Then, if the current mode is in automatic focusing mode in operation S4107, the digital camera processor 507 in operation S4108 performs auto-focusing to drive the focus lens. The algorithm of the auto-focusing will be described with reference to FIGS. 6 through 20.

Then, the digital camera processor 507 performs the following operations when the SH1 signal that is the first step signal of the shutter release button goes to the ON-state in operation S4109.

At first, the digital camera processor 507 determines whether an SH2 signal is in the ON state or not in operation S4110. If the SH2 signal is not in the ON state, the digital camera processor 507 performs the operations S4109 through S4110, repeatedly because the off-state of SH2 signal denotes that the user has not pressed the second step of the shutter release button.

If the SH2 signal is in the ON state, the digital camera processor 507 creates an image file in a memory card in operation S4111 because the ON state of SH2 signal denotes that the user pressed the second step of the shutter release button. Then, the digital camera processor 507 captures the image in operation S4112. That is, the digital camera processor 507 receives the image data from the CDS-ADC 501. Then, the digital camera processor 507 compresses the received image data in operation S4113. The digital camera processor 507 stores the compressed image file in operation S4114.

Figure 6:
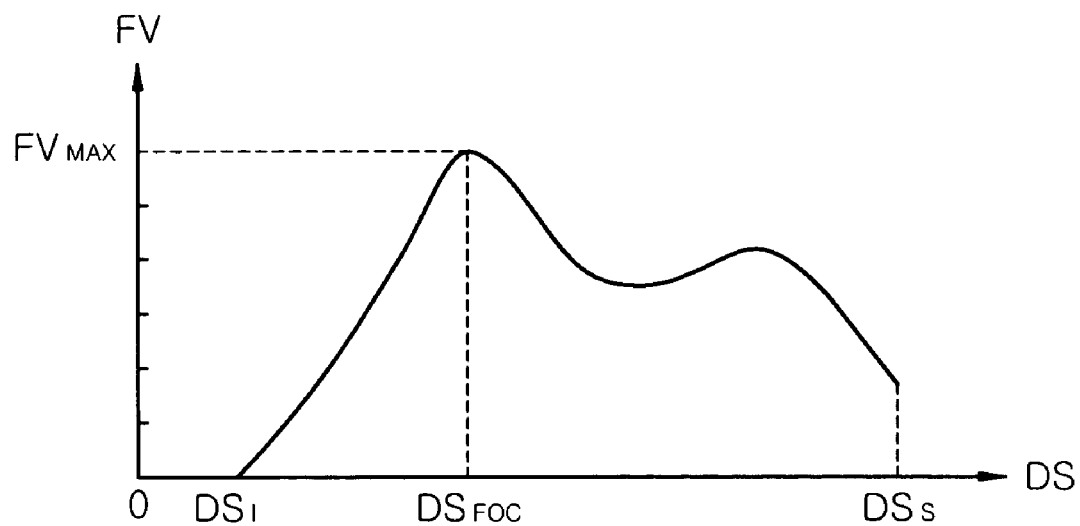
FIG. 6 is a graph for explaining a fundamental concept of auto-focusing shown in FIG. 5.

FIG. 6 is a graph for explaining a fundamental concept of auto-focusing operation S4108 shown in FIG. 5. A reference DS in FIG. 6 denotes the number of driving steps of the focus lens FL as a position of the focus lens FL. A reference FV is a focus value calculated by adding differences between adjacent pixel data which is an average contrast between adjacent pixel data. A reference $DS_I$ denotes a driving step number of a focus lens FL set as a highest position. A reference $DS_{FOC}$ denotes a driving step number of focus lens FL at the maximum focus value $FV_{MAX}$ position in the predetermined lens-driving range ($DS_I$ to $DS_S$), and a reference $DS_S$ denotes a driving step number of focus lens set as a lowest position.

Referring to FIG. 6, the focus values FV are calculated at each position of focus lens FL while the focus lens FL is driven in the unit of a step within the lens-driving range $DS_I$ to $DS_S$. The maximum focus value $FV_{MAX}$ of the lens-driving range $DS_I$ to $DS_S$ is selected from the calculated focus values FV. Then, the focus lens FL is finally driven to the position of the maximum focus value $FV_{MAX}$.

Figure 7:
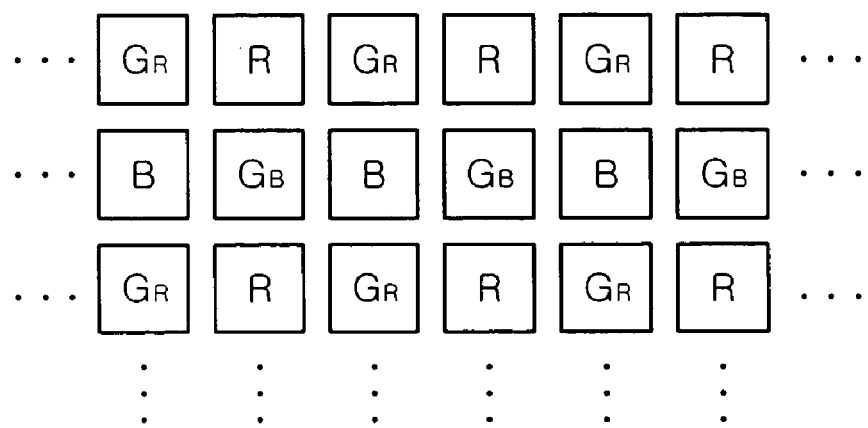
FIG. 7 is a view of pixel data structure input to the digital camera processor from CDS-ADC shown in FIG. 2.

FIG. 7 is a view of a structure of pixel data input to the digital camera processor from the CDS-ADC shown in FIG. 2. Referring to FIG. 7, red pixel data R and green pixel data $G_r$ are repeatedly arranged to alternate with one another in odd columns and even rows. Also, blue pixel data B and green pixel data $G_B$ are repeatedly arranged to alternate in even columns and odd rows.

As shown in FIG. 7, the green pixel data $G_R$, $G_B$ which are close to illuminance element are used to calculate the focus value FV. When the pixel data is transformed to brightness data and chromaticity data, the brightness data is directly used to calculate the focus value. That is, the focus value FV is calculated by adding adjacent green pixel data $G_R$ and $G_B$ in a horizontal direction and a vertical direction. Herein, the noise level is set to be in reverse proportion to the illuminance of the photographing area, and the noise level is subtracted from pixel data larger than the noise level. The result of subtracting is used as the pixel data to calculate the focus value in the present embodiment. Such a calculation will be described in more detail with reference to FIGS. 8 through 14.

Figure 8:
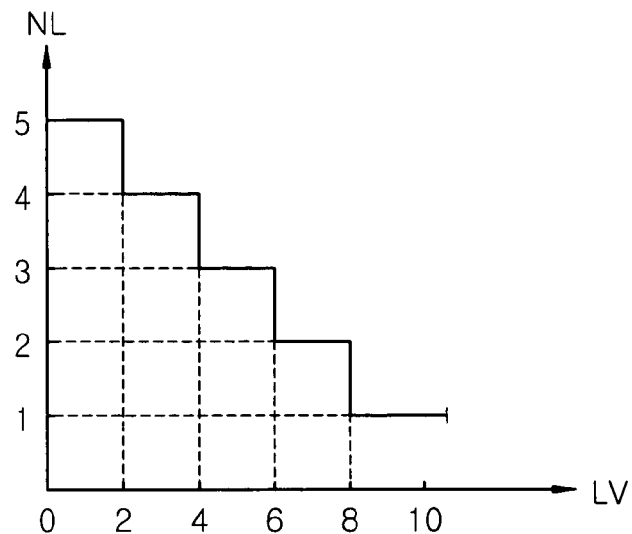
FIG. 8 is a graph showing a variable noise level that varies according to a illuminance of a photographing area when the illuminance of photographing area is smaller than 8 which is a reference illuminance value of a photographing area in the auto-focusing operation S4108 in FIG. 5.
Figure 9:
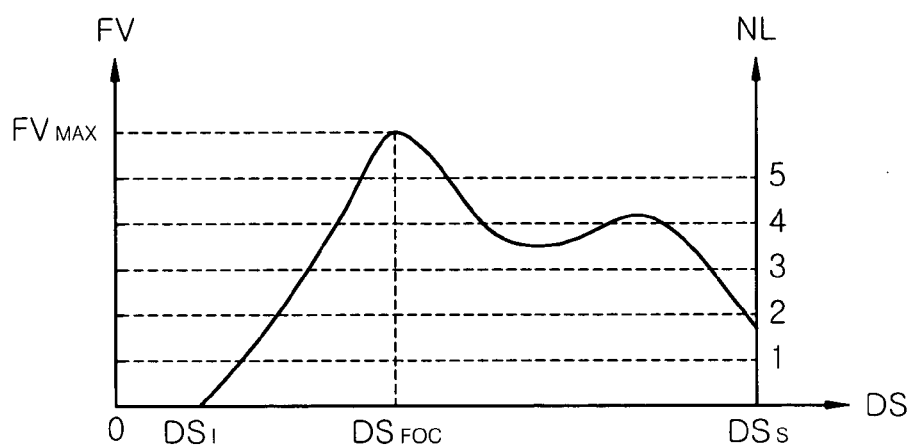
FIG. 9 is a graph showing that a variable noise level is used in the auto-focusing operation S4108 in FIG. 5.
Figure 10:
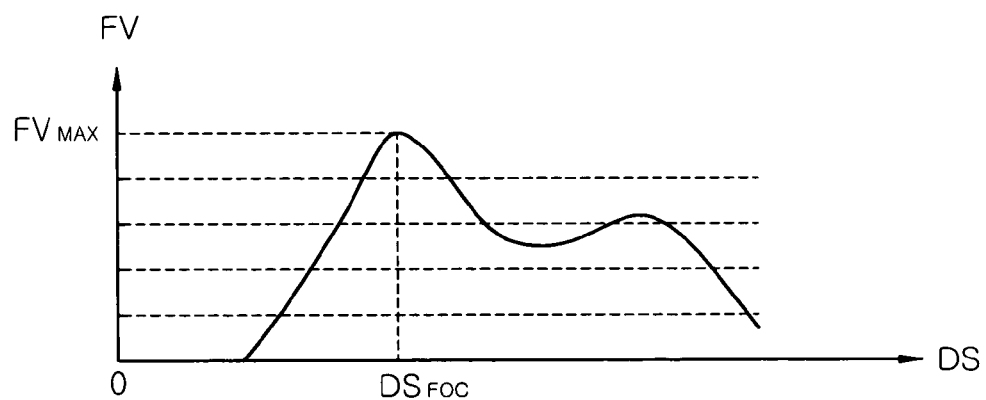
FIG. 10 is a characteristic graph obtained in the auto-focusing operation S4108 in FIG. 5 when a noise level is 1.
Figure 11:
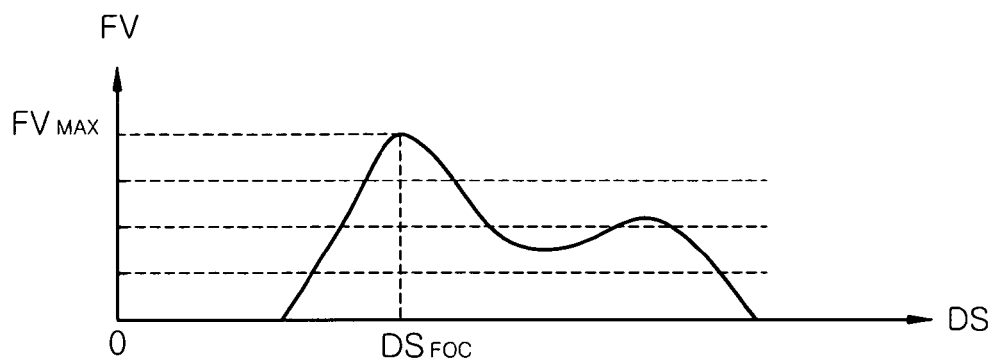
FIG. 11 is a characteristic graph obtained in the auto-focusing operation S4108 in FIG. 5 when a noise level is 2.
Figure 12:
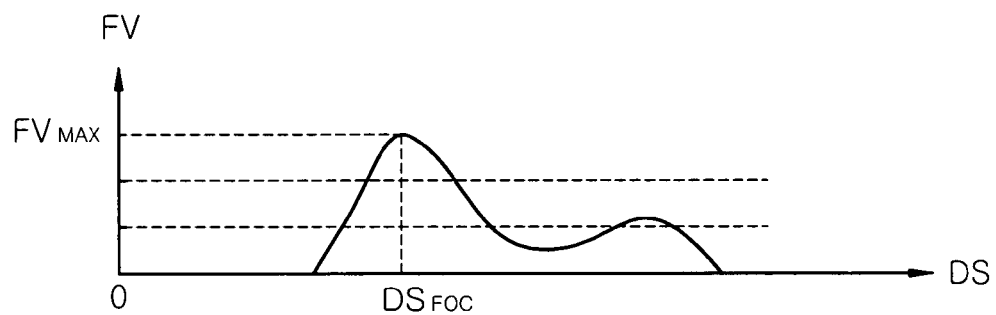
FIG. 12 is a characteristic graph obtained in the auto-focusing operation S4108 in FIG. 5 when a noise level is 3.
Figure 13:
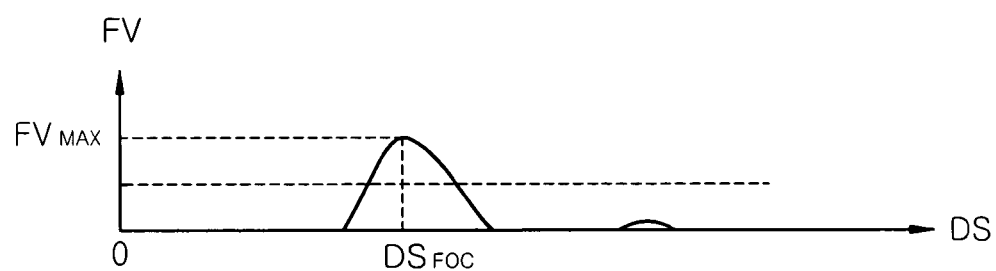
FIG. 13 is a characteristic graph obtained in the auto-focusing operation S4108 in FIG. 5 when a noise level is 4.
Figure 14:
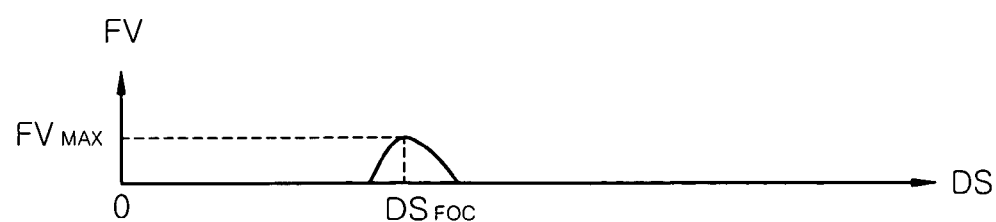
FIG. 14 is a characteristic graph obtained in the auto-focusing operation S4108 in FIG. 5 when a noise level is 5.

FIG. 8 is a graph showing a variable noise level that varies according to the illuminance of a photographing area when the illuminance of photographing area is smaller than 8 which is a reference illuminance value of a photographing area in the auto-focusing operation S4108 in FIG. 5. FIG. 9 is a graph showing that a variable noise level is used in the auto-focusing operation S4108 in FIG. 5. FIG. 10 is a characteristic graph obtained in the auto-focusing operation S4108 in FIG. 5 when a noise level is 1. FIG. 11 is a characteristic graph obtained in the auto-focusing operation S4108 in FIG. 5 when a noise level is 2. FIG. 12 is a characteristic graph obtained in the auto-focusing operation S4108 in FIG. 5 when a noise level is 3. FIG. 13 is a characteristic graph obtained in the auto-focusing operation S4108 in FIG. 5 when a noise level is 4. FIG. 14 is a characteristic graph obtained in the auto-focusing operation S4108 in FIG. 5 when a noise level is 5. Like number references denotes like elements in FIG. 6 and FIGS. 9 through 14.

Referring to FIGS. 8 through 14, the algorithm for the auto-focusing operation S4108 will be described.

At first, a noise level NL is set as a fixed value of 1 when the illuminance value of the photographing area is larger than a reference value of 8. If the illuminance value of the photographing area is smaller than or equal to a reference value of 8, a variable noise level is set. The variable noise level varies according to the illuminance value of the photographing area. For example, if the illuminance value is smaller than or equal to 8 and larger than 6, the variable noise level is set as 2. If the illuminance value is smaller than or equal to 6 and larger than 4, the noise level NL is set as 3. If the illuminance value is smaller than or equal to 4 and larger than 2, the noise level NL is set as 4. And, if the illuminance value LV is smaller than or equal to 2, the noise level is set as 5.

Then, the focus values FV are calculated at each position of focus lens FL while driving the focus lens in the unit of a step within the lens-driving range $DS_I$ to $DS_S$. The maximum focus value in the lens-driving range $DS_I$ to $DS_S$ is selected from the calculated focus values. Then, the focus lens is driven to the position of the maximum focus value $FV_{MAX}$.

The focus value is calculated by adding differences between adjacent pixel data in the horizontal direction and the vertical direction. Herein, the noise level is subtracted from the pixel data if the pixel data is larger than the noise level NL, and the result of subtracting is used as the pixel data to calculate the maximum focus value.

As described above, if the illuminance value of the photographing area is smaller than or equal to the predetermined reference value of 8, the focus value will be in proportion to the illuminance value of the photographing area because the pixel data is variably decreased according to the illuminance value in the photographing area. Therefore, a variation ratio between adjacent focus values is in reverse proportion to the illuminance value of the photographing area.

For example, if a focus value of one position DS of focus lens is 100 and a focus value of next position DS is 90, the variation ratio between adjacent focus value is 0.1 ((100-90)/100). However, if the focus values FV are decreased by subtracting 80 from them because the maximum noise level NL in the darkest area is used as shown in FIG. 14, the focus value 100 becomes 20 and the adjacent focus value 90 becomes 10. As a result, the variation ratio increases to 0.5 ((20-10)/20).

Therefore, such a method of calculating the focus value overcomes the conventional problem that the variation ratio between adjacent focus values is reduced in proportion to the illuminance value in the photographing area. Thus, the focus can be accurately and quickly adjusted even though the illuminance value is low in the photographing area.

Figure 15:
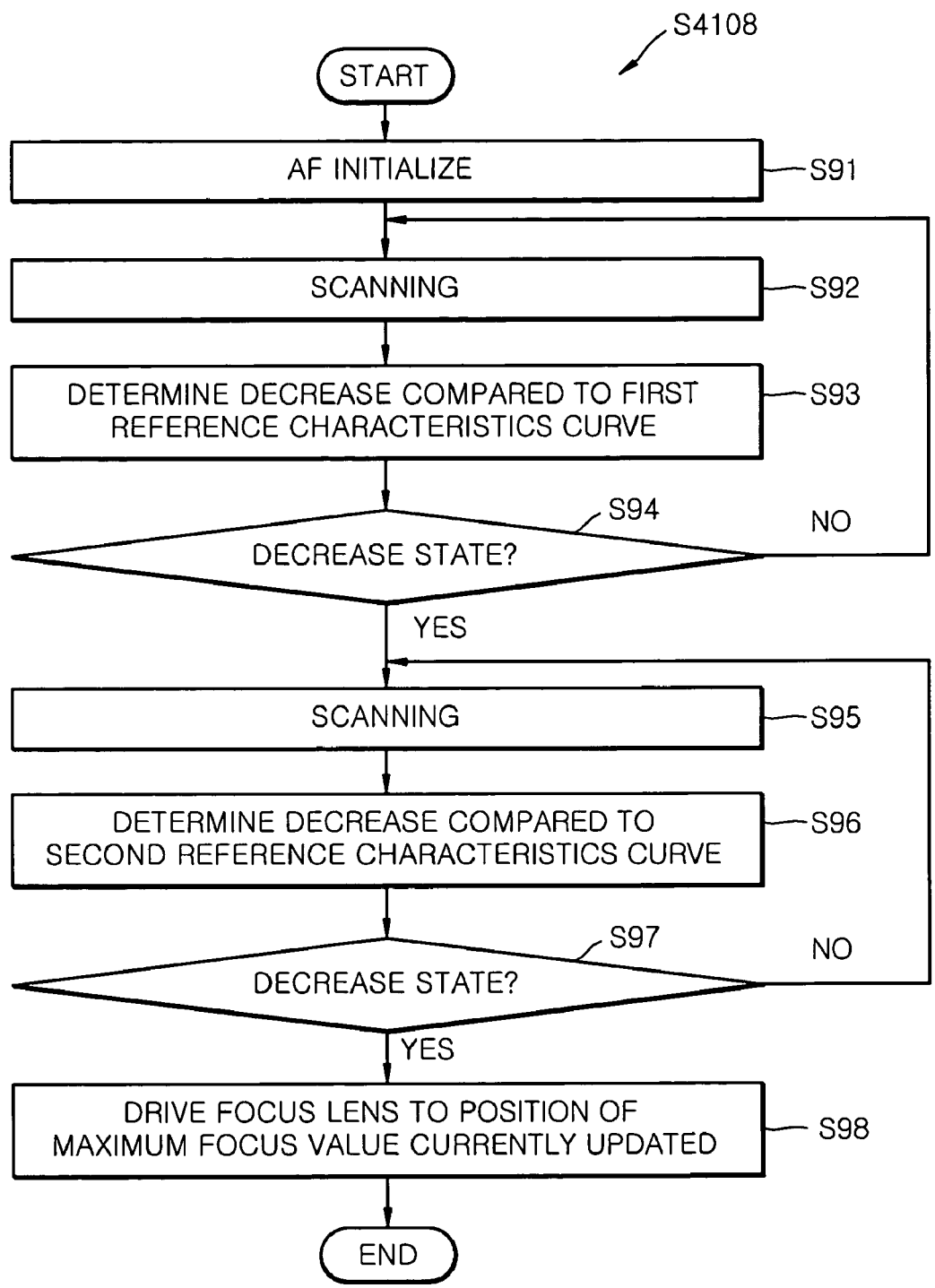
FIG. 15 is a flowchart of an algorithm in the auto-focusing operation S4108 in FIG. 5.
Figure 16:
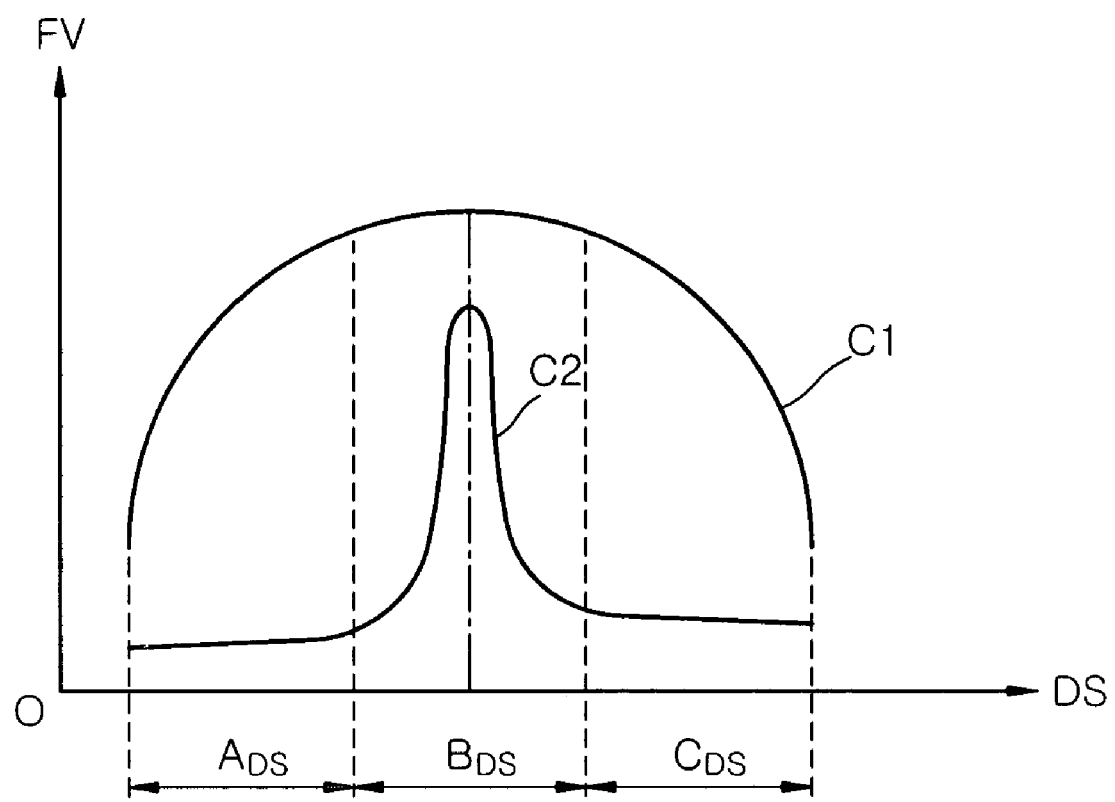
FIG. 16 is a graph showing a first and a second reference characteristic curve used in the operations S93 and S96 in FIG. 15.

FIG. 15 is a flowchart of an algorithm in the auto-focusing operation S4108 in FIG. 5, and FIG. 16 is a graph showing a first and a second reference characteristic curve used in the operations S93 and S96 in FIG. 15. A reference DS denotes the driving step number of the focus lens FL and a reference FV denotes a focus value. A reference C1 denotes a first reference characteristic curve and a reference C2 denotes a second reference characteristics curve. A $B_{DS}$ denotes a region that uses the second reference characteristics C2 at around the maximum focus value to be finally set, and references $A_{DS}$ and $C_{DS}$ denotes regions using the first reference characteristic curve.

The algorithm for calculating the maximum focus value $FV_{MAX}$ and a focus position value $DS_{FOC}$ will be described with reference to FIGS. 15 and 16.

At first, the digital camera processor 507 performs the initialization operation in operation S91. Then, the digital camera processor 507 performs a scanning process without using a supplementary light source without regard to the illuminance around a target object in operation S92.

In the scanning operation, if a macro mode is set by a user because the target object is within a first distance of 30 to 80 cm from the focus lens FL, the scanning process is performed within a focus lens position range corresponding to the first distance. On the other hand, if a normal mode is set by a user because the target object is located at a distance from the focus lens FL that is farther than the first distance, such as 80 cm to infinity, the scanning process is performed within a focus lens position range corresponding to this distance. In the scanning operation S92, including the macro-mode scanning or the normal-mode scanning, the digital camera processor 507 calculates the focus values at each of the first driving steps of the focus motor, for example, 8 steps, and the maximum focus value is updated whenever the focus value is calculated.

Then, in operation S93, it is determined whether the calculated focus value is in a decreasing state or in an increasing state compared to the first reference characteristic curve C1 in FIG. 16, whenever the focus value is calculated in the scanning operation S92. The digital camera processor 507 determines that the calculated focus value is in the decreasing state if the percentage of a decrease of the calculated focus value compared to the maximum focus value is larger than a first reference percentage based on the first reference characteristic C1. On the contrary, if not, the digital camera processor 507 determines that the calculated focus value is in the increasing state. Herein, the first reference percentage is low, about 10 to 20 percent (%), compared to the first reference characteristics curve C1. It is because there is a large possibility that the current focus value is not around the final maximum focus value. If not, there are few differences between adjacent positions.

If the digital camera processor 507 determines the calculated focus value is in the decreasing state in operation S94, the digital camera processor 507 inspects the position of the maximum focus value based on the second reference characteristics curve C2 in FIG. 12 in operations S95 through S97. Herein, the scanning operation S92 such as the macro-mode scanning operation or the normal-mode scanning operation is terminated, and the position of the focus lens is finally set through performing a scanning with a second driving step number which is smaller than the first driving step number, for example, 1, in the adjacent region of the maximum focus value. That is, the digital camera processor 507 calculates a focus value in the unit of a step of 1 of the focus motor $M_F$ and updates the maximum focus value among the calculated focus values whenever the focus value is calculated in operation S95.

Then, whenever the focus value is calculated, it determines whether the calculated focus value in the decreasing state or in the increasing state based on the second reference characteristics curve C2 in operation S96. The digital camera processor 507 determines that the calculated focus value is in the decreasing state if the percentage decrease of the calculated focus value based on the maximum focus value is larger than the second reference percentage based on the second reference characteristics curve C2. And, the digital camera processor 507 determines that the calculated focus value is in the increasing state if not. Herein, the second reference percentage is larger than the first reference percentage because there are large differences between adjacent focus values around the target maximum focus value.

If it determines that the calculated focus value is in the decreasing state in operation S97, the position of the maximum focus value currently updated is set as a position of the maximum focus value $FV_{Max}$ for all lens-driving regions of a focus lens LF. Accordingly, the digital camera processor 507 drives the focus lens FL to the position $DS_{FOC}$ of currently updated maximum focus value in operation S98, as shown in FIGS. 9 through 14.

Figure 17:
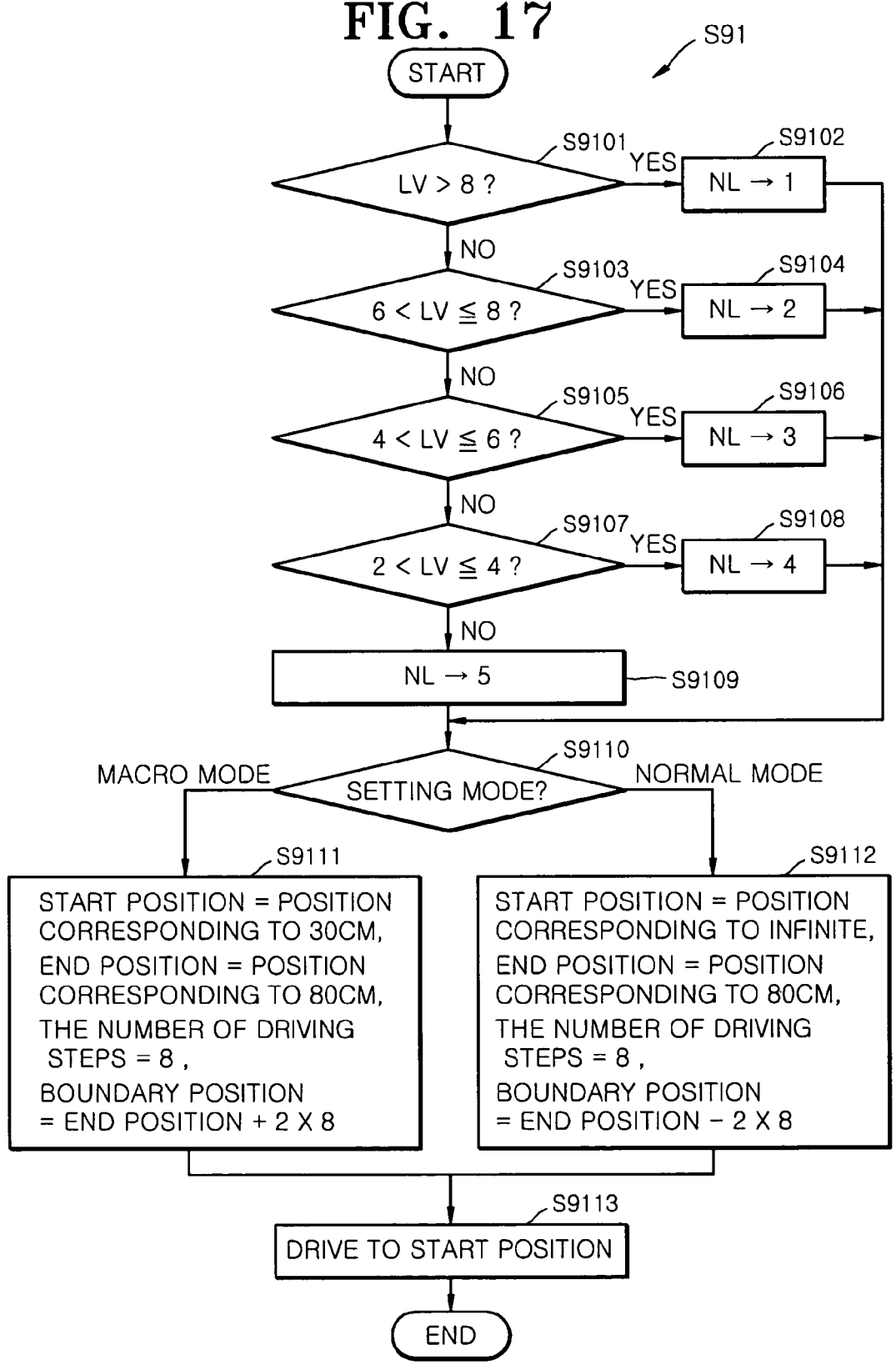
FIG. 17 is a flowchart of an algorithm in the operation S91 in FIG. 15.

FIG. 17 is a flowchart of an algorithm in the operation S91 in FIG. 15. The algorithm for the initialization operation S91 in FIG. 15 will be described with reference to FIG. 17.

At first, if the illuminance value LV in the photographing area is larger than the reference value 8 in operation S9101, the digital camera processor 507 sets the noise level NL as a fixed value 1 in operation S9102.

If the illuminance value LV in the photographing area is smaller than or equal to the reference value 8, the digital camera processor 507 sets a variable noise level NL that varies according to the illuminance value of the photographing area in operations S9103 to S9109.

For example, if the illuminance value is smaller than or equal to 8 and larger than 6 in operation S9103, the noise level is set as 2 in operation S9104. If the illuminance value is smaller than or equal to 6 and larger than 4 in operation S9105, the noise level is set as 3 in operation S9106. If the illuminance value is smaller than or equal to 4 and larger than 2 in operation S9107, the noise level NL is set as 4 in operation S9108. Then, the illuminance value is smaller than or equal to 2 in operation S9107, the noise level NL is set as 5 in operation S9109.

Then, if the macro mode is set by the user in operation S9110, the position step number of the focus motor MF corresponding to a lens-driving start position of the focus lens FL is set to the position step number corresponding to the distance between the lens and the target object such as 30 cm, and the position step number of the focus motor MF corresponding to a lens-driving end position of the focus lens FL is set to the position step number corresponding to the distance between the lens and the target object such as 80 cm. Also, the driving step number of focus motor MF is set as 8, and the position step number of focus motor corresponding to the lens-driving ending position is set by adding two times of the driving step number that is 8 in operation S9111. Herein, the boundary position may not be used.

If the normal mode is set by the user in operation S9110, the position step number of a focus motor corresponding to the lens-driving start position of the focus lens is set as a position step number corresponding to an infinite distance between lens and target object, and the position step number of the focus motor corresponding to the lens-driving end position of the focus lens is set as a position step number corresponding to a distance such as 80 cm between the lens and the target object. Also, the number of driving steps of focus motor is set as 8, and the number of position steps of focus motor corresponding to a boundary position of focus lens is set by subtracting two times of driving step number that is 8 from the position step number of focus motor corresponding to the lens-driving end position in operation S9112. Herein, the boundary position may not be used.

The digital camera processor 507 drives the focus motor $M_F$ through a microcontroller 512 to drive the focus lens FL to the lens-driving begin position in operation S9113.

Figure 18:
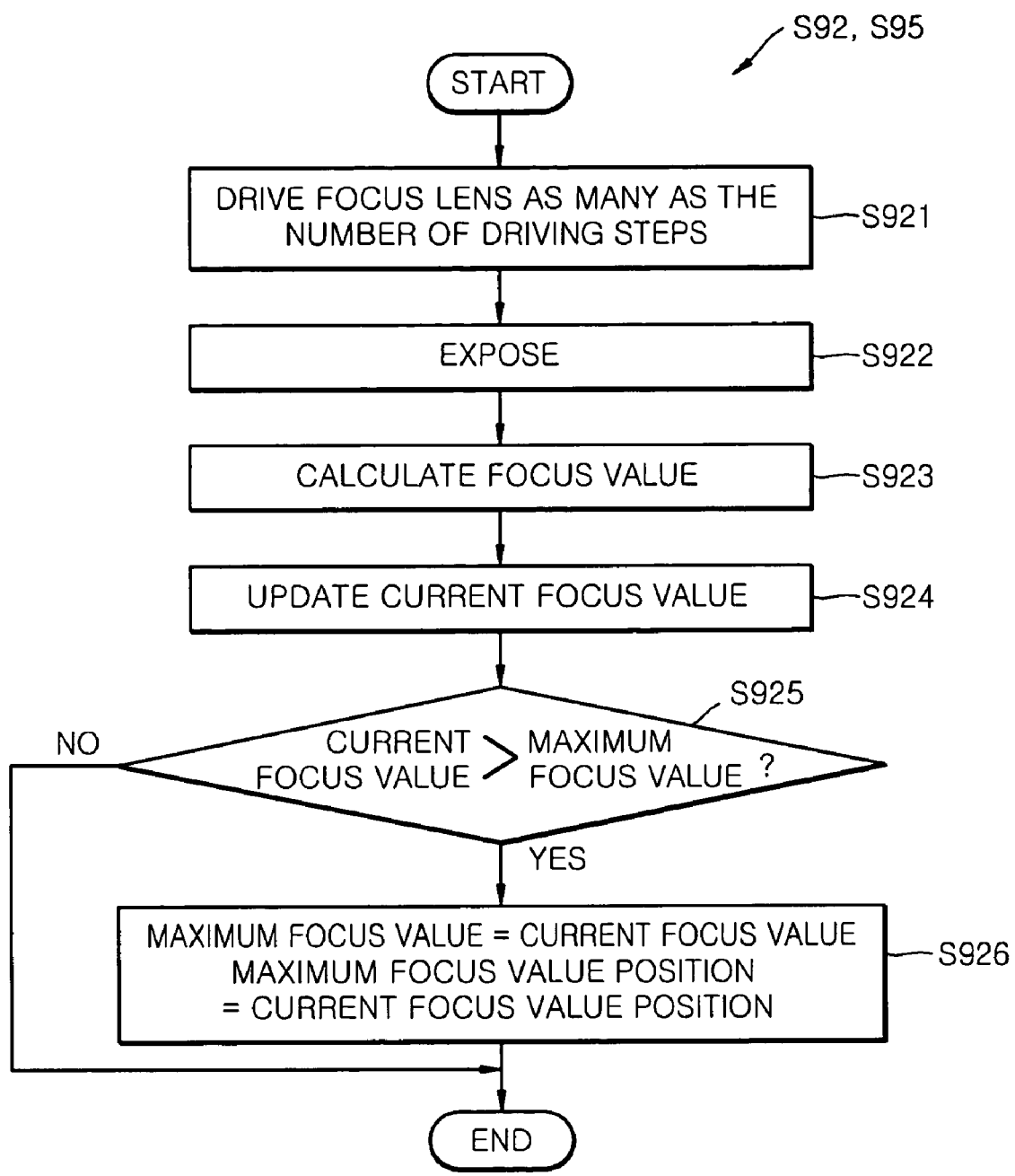
FIG. 18 is a flowchart of an algorithm in the operations S92 and S95 in FIG. 15.

FIG. 18 is a flowchart of an algorithm in the operations S92 and S95 in FIG. 15. The algorithms in the operation S92 and S95 will be described with reference to FIG. 18.

At first, the digital camera processor 507 drives the focus motor $M_F$ as many as the number of driving steps through the microcontroller 512 to drive the focus lens FL in operation S921.

Then, the digital camera processor 507 drives the aperture motor $M_A$ through the microcontroller 512 and controls the OEC to be exposed in operation S922. The digital camera processor 507 calculates the focus value by processing pixel data from the CDS-ADC 501 in operation S923. Such an operation S923 was already described in detail.

The digital camera processor 507 updates the current focus value from the calculated focus value in operation S924. The digital camera processor 507 updates the maximum focus value as the current focus value in operation 925 and updates the maximum focus value position as the current focus value position in operation S926 if the current focus value is larger than the maximum focus value in operation S925.

Figure 19:
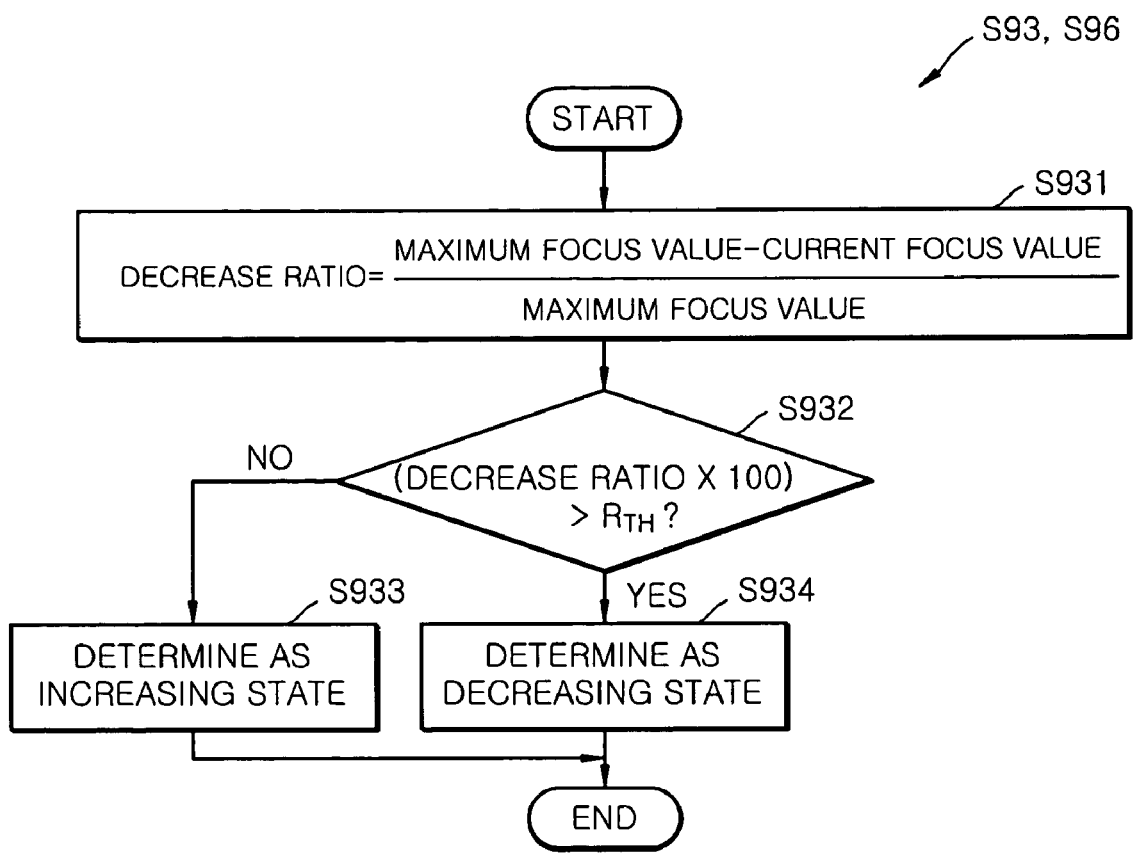
FIG. 19 is a flowchart of an algorithm in the operations S93 and S96 according to an embodiment of the present invention.

FIG. 19 is a flowchart of an algorithm in the operations S93 and S96 according to an embodiment of the present invention. Referring to FIG. 19, the algorithms for the operations S93 and S96 will be described.

At first, the digital camera processor 507 calculates the decrease ratio using the following Eq. 1 in operation S931.

$$\text{Decrease ratio} = \frac{\text{maximum focus value} - \text{current focus value}}{\text{maximum focus value}} \qquad \text{Eq. 1}$$

The digital camera processor 507 determines that the current calculated focus value is in the decreasing state if the decrease percentage that is calculated by multiplying 100 to the decrease ratio is larger than the first reference percentage $R_{TH}$ based on the first reference characteristics curve C1 in operations S932 to S934. If not, the digital camera processor 507 determines that the current calculated focus value is in the increasing state in operations S932 and S933.

Figure 20:
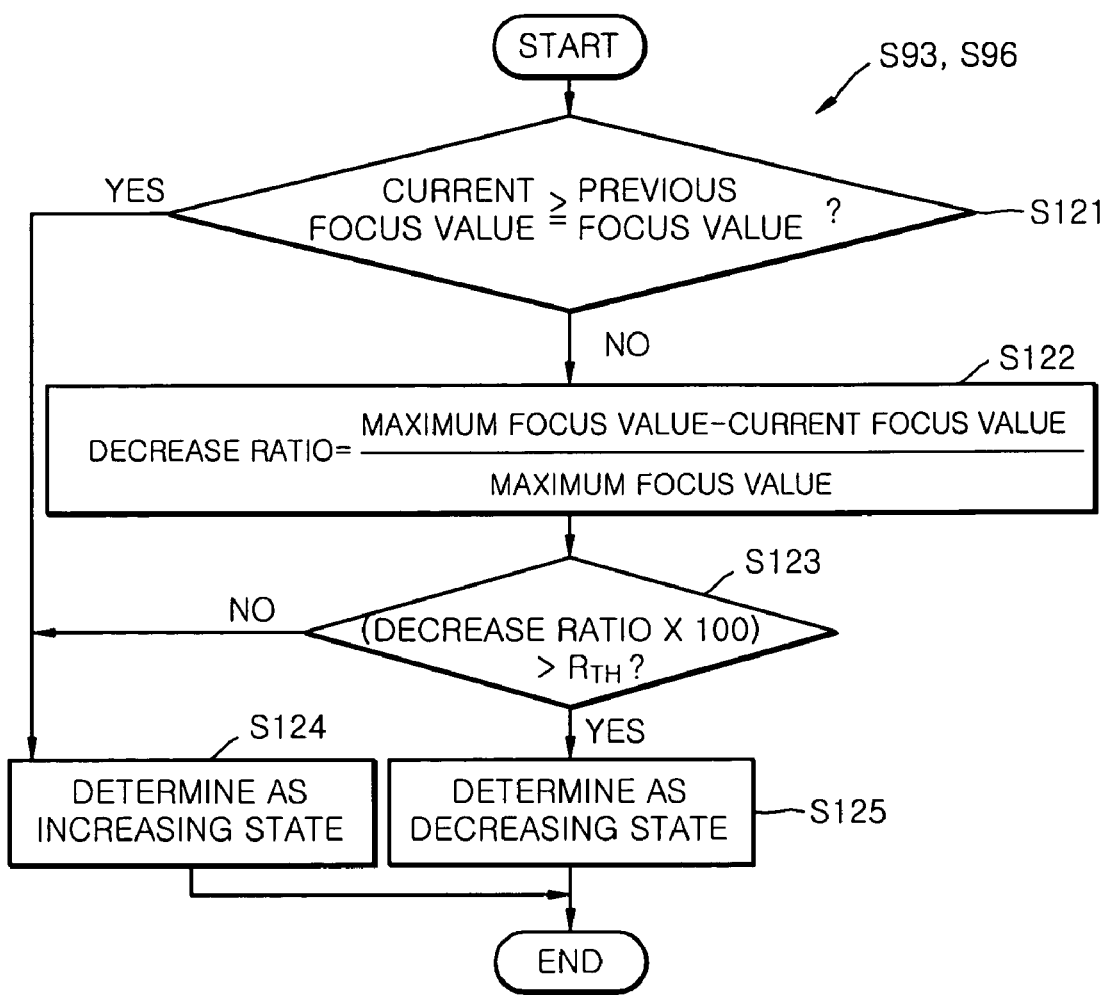
FIG. 20 is a flowchart of an algorithm in the operations S93 and S96 according to another embodiment of the present invention.

FIG. 20 is a flowchart of an algorithm in the operations S93 and S96 according to another embodiment of the present invention. Referring to FIG. 20, another algorithm for the operations S93 and S96 will be described. The algorithm of FIG. 20 determines the increasing state and the decreasing state more accurately than the algorithm shown in FIG. 19.

At first, the digital camera processor 507 determines that the calculated focus value is in the increasing state if the current focus value is equal to or larger than the previous focus value and the related process is terminated in operations S121 and S124.

Meanwhile, the digital camera processor 507 performs following operations when the currently calculated focus value is smaller than the previous focus value in operation S121.

At first, the digital camera processor 507 calculates the decrease ratio using Eq. 1 in operation S122. Then, the digital camera processor 507 calculates the decrease percentage by multiplying 100 to the decrease ratio, and determines that the currently calculated focus value is in the decreasing state if the decrease percentage is larger than the first reference percentage $R_{TH}$ based on the first reference characteristics curve C1 in operation S123 and S125. If not, the digital camera processor 507 determines that the currently calculated focus value is in the increasing state in operations S123 and S124.

As described above, the auto-focusing method according to the present invention and the digital image processing apparatus using the auto-focusing method sets the variable noise level that varies according to the illuminance of the photographing area if the illuminance value is smaller than or equal to the predetermined reference value. Also, the auto-focusing method and the digital image processing apparatus according to the present invention subtracts the noise level from the pixel data if the pixel data is larger than the noise level and uses the result of subtracting as the pixel data to calculate the focus value in the searching operation.

Therefore, the focus values are in proportional to the illuminance in the photographing area since the pixel data is variably decreased according to the illuminance of the photographing area if the illuminance value of photographing area is smaller than the predetermined reference value. Also, the variation ratio between adjacent focus values is in reverse proportion to the illuminance of photographing area. As a result, the present invention overcomes the problem of the variation ratio between adjacent focus values decreasing as illuminance of photographing area decreases.

Finally, the auto-focusing method and the digital image processing apparatus using the same according to the present invention accurately and quickly adjust the focus of the target object when the illuminance in the photographing area is low.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A method for auto-focusing a digital image processing apparatus, the method comprising:
    comparing an illuminance of an area that is to be photographed to a reference value, if the illuminance is greater than the reference value setting a reference noise level, if the illuminance is less than or equal to the reference value setting a variable noise level that varies according to the illuminance of the area to be photographed, wherein the variable noise level is at least twice the reference noise level;
    moving a focus lens along a range of positions in a lens driving range;
    subtracting the variable noise level from a pixel data when the value of the pixel data is larger than that of the variable noise level; and
    based on the subtracting step, calculating a focus value for each position of the focus lens within the lens-driving range and selecting a maximum focus value among the calculated focus values.

2. The method of claim 1, wherein the final focus position of the focus lens is the position of the focus lens corresponding to the maximum focus value of the lens-driving range.

3. The method of claim 1, wherein the variable noise level comprises a first noise level and a second noise level.

4. The method of claim 3, wherein the first noise level is different than the second noise level.

5. The method of claim 4 further comprising dividing up into ranges the illuminance that is smaller than or equal to the reference value and setting the first noise level for a first range of the illuminance and setting a second noise level for a second range of the illuminance.

6. The method of claim 5, wherein the noise level for each range of illuminance is in reverse proportion to the illuminance of the area to be photographed that corresponds to each range of illuminance.

7. The method of claim 1, wherein the focus value is calculated by adding differences between adjacent pixel data.

8. The method of claim 7, wherein the pixel data is green pixel data.

9. The method of claim 7, wherein adding differences between adjacent pixel data comprises adding differences between adjacent green pixel data in a horizontal direction and a vertical direction.

10. The method of claim 1, wherein a staffing position for moving the focus lens within the lens-driving range corresponds to a distance from the focus lens to an object to be photographed.

11. A method for auto-focusing a digital image processing apparatus, the method comprising:
    receiving a signal generated by input from a user;
    moving a focus lens to a first position based at least in part on a zoom lens position corresponding to the received signal;
    setting a reference noise level if an illuminance of a photographing area is larger than a reference value, and setting a variable noise level that varies according to the illuminance of the photographing area if the illuminance of the photographing area is smaller than or equal to the reference value, wherein the variable noise level is at least twice the reference noise level;

calculating a focus value for each incremental position of the focus lens within a lens-driving range by adding differences between adjacent pixel data; and moving the focus lens to a final position corresponding to a position of the maximum focus value calculated for the lens-driving range, wherein the variable noise level is subtracted from pixel data that is larger than the variable noise level and the result is used to calculate the focus value.

12. The method of claim 11, further comprising selecting the maximum focus value, wherein a current maximum focus value is updated by comparing focus values of positions of the focus lens in sequence, and if a decrease ratio of a current focus value compared to the current maximum focus value is larger than a predetermined value, the current maximum focus value becomes the maximum focus value of the lens-driving range.

13. The method of claim 12, wherein the predetermined value is based on a characteristic curve.

14. The method of claim 11, wherein the variable noise level comprises a first noise level and a second noise level, and further comprising the step of dividing up into ranges the illuminance of the photographing area that is smaller than or equal to the reference value and setting the first noise level for a first range of the illuminance and setting a second noise level for a second range of the illuminance.

15. The method of claim 14, wherein the noise level for each range of illuminance is in reverse proportion to the illuminance of the photographing area corresponding to each range of illuminance.

16. A digital image processing apparatus, the apparatus comprising:

an optical system having a focus lens;

a driving unit for the focus lens;

an optoelectric converting unit for receiving light from the optical system and converting the received light to pixel signals;

an analog-to-digital converter for converting the pixel signals from the optoelectric converting unit to pixel data; and a controlling unit for driving the focus lens to a final focus position within a lens-driving range by setting a reference noise level if an illuminance of an area to be photographed is larger than a reference value, and setting a variable noise level that varies according to the illuminance of the area to be photographed if the illuminance is smaller than or equal to the reference value, wherein the variable noise level is at least twice the reference noise level, and calculating a focus value for each position of the focus lens within the lens-driving range and selecting a maximum focus value of the lens-driving range among the calculated focus values, wherein in calculating the focus value the variable noise level is subtracted from pixel data that is larger than the variable noise level and the result is used to calculate the focus value.

17. A method for auto-focusing a digital image processing apparatus, the method comprising:

comparing an illuminance of an area that is to be photographed to a reference value, if the illuminance is greater than the reference value setting a reference noise level, if the illuminance is less than or equal to the reference value setting a variable noise level that varies according to the illuminance of the area to be photographed, wherein the variable noise level is one of four different noise levels;

moving a focus lens along a range of positions in a lens driving range;

subtracting the variable noise level from a pixel data when the value of the pixel data is larger than that of the variable noise level; and based on the subtracting step, calculating a focus value for each position of the focus lens within the lens-driving range and selecting a maximum focus value among the calculated focus values.

18. A method for auto-focusing a digital image processing apparatus, the method comprising:

comparing an illuminance value to a reference value, if the illuminance value is greater than the reference value setting a reference noise level, if the illuminance value is less than or equal to the reference value setting a variable noise level that varies according to the illuminance value, wherein the illuminance value represents an illuminance of the whole area that is to be photographed and the variable noise level is one of four different noise levels;

moving a focus lens along a range of positions in a lens driving range;

subtracting the variable noise level from a pixel data when the value of the pixel data is larger than that of the variable noise level; and based on the subtracting step, calculating a focus value for each position of the focus lens within the lens-driving range and selecting a maximum focus value among the calculated focus values.

19. The method of claim 18, wherein the variable noise level is greater than the reference noise level.

* * * * *

UNITED STATES PATENT AND TRADEMARK OFFICE
CERTIFICATE OF CORRECTION

PATENT NO. : 7,639,302 B2  Page 1 of 1
APPLICATION NO. : 11/403182
DATED : December 29, 2009
INVENTOR(S) : Bok et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 784 days.

Signed and Sealed this

Ninth Day of November, 2010

David J. Kappos
*Director of the United States Patent and Trademark Office*